March 3, 1936.  J. E. HAMMERS ET AL  2,032,572
AIR CONDITIONER FOR VEHICLES
Filed Oct. 19, 1934  3 Sheets-Sheet 1

INVENTORS,
James E. Hammers,
Burt F. Hammers,
Ezra C. Buehler.
BY
Hovey & Hamilton
ATTORNEYS.

March 3, 1936.   J. E. HAMMERS ET AL   2,032,572
AIR CONDITIONER FOR VEHICLES
Filed Oct. 19, 1934   3 Sheets-Sheet 2
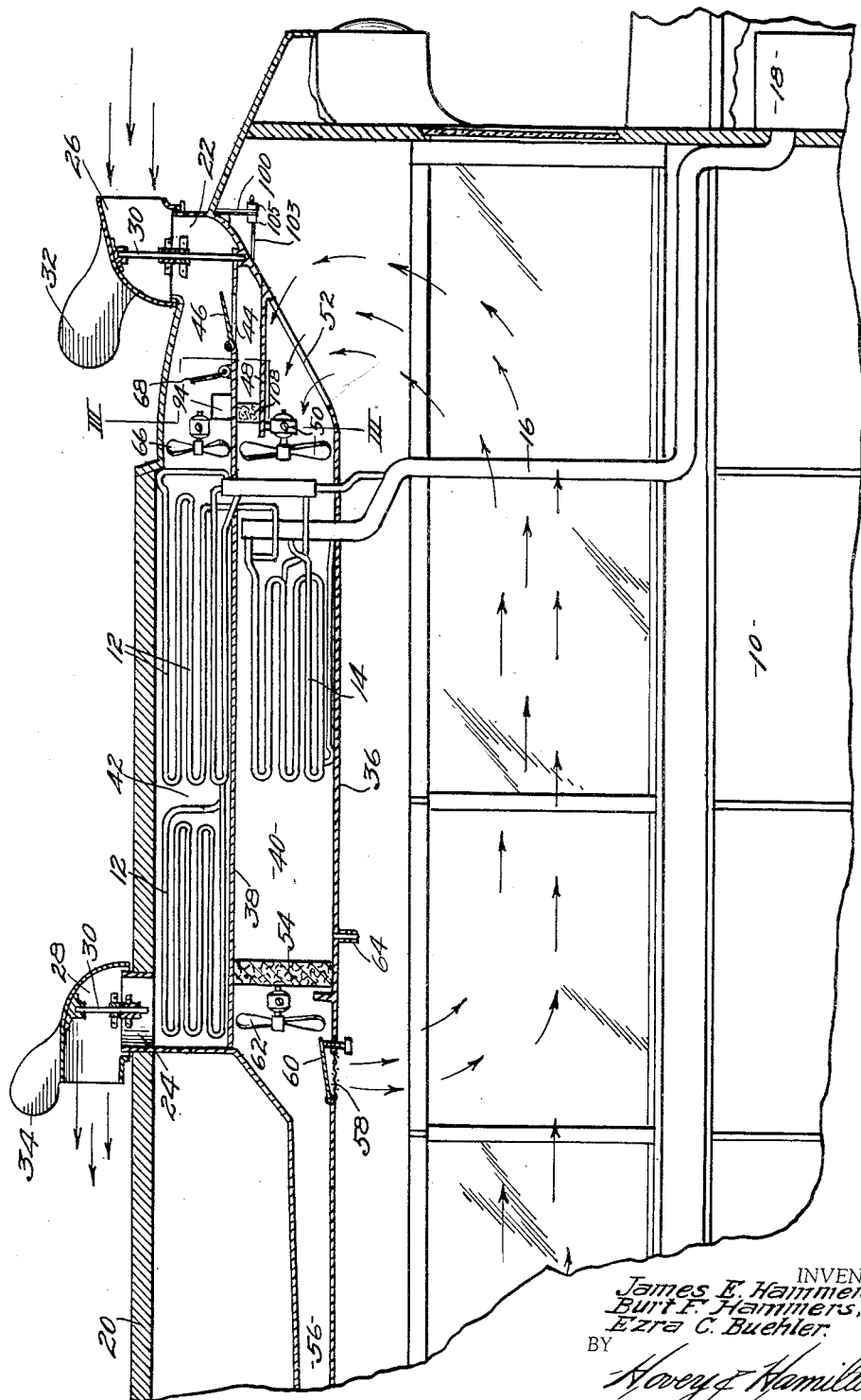

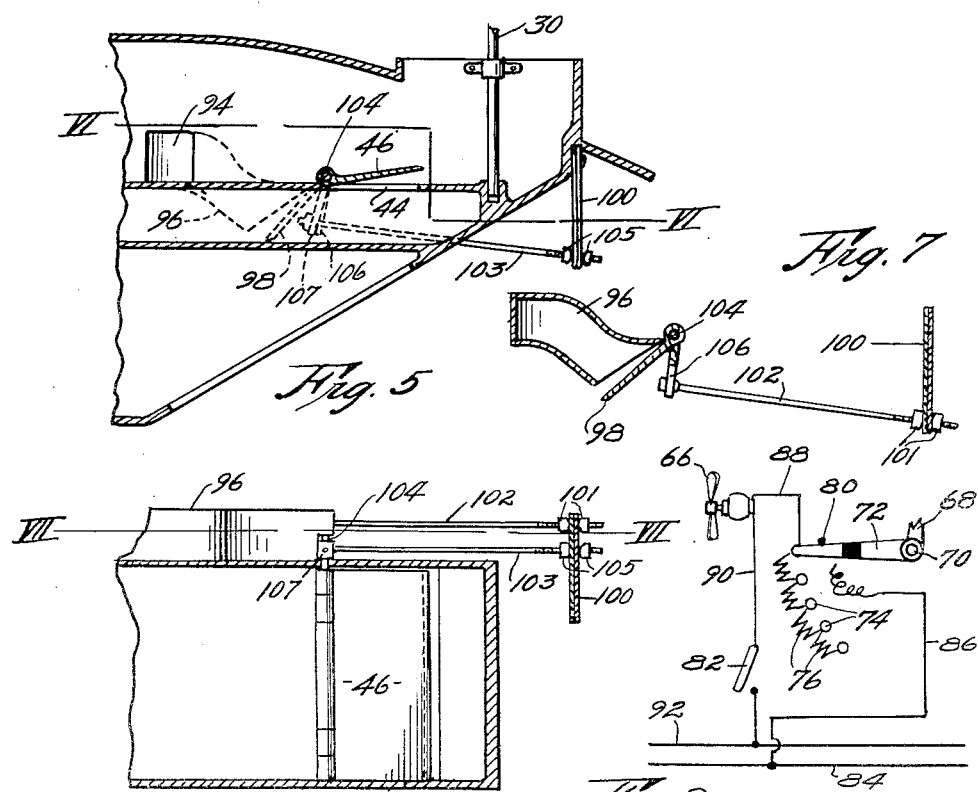

Patented Mar. 3, 1936

2,032,572

UNITED STATES PATENT OFFICE 2,032,572

AIR CONDITIONER FOR VEHICLES

James E. Hammers, Burt F. Hammers, and Ezra C. Buehler, Lawrence, Kans., assignors of forty per cent to Ellen S. Bates and Frank Bates, both of Topeka, Kans.

Application October 19, 1934, Serial No. 749,063

12 Claims. (Cl. 62—117)

This invention relates to automotive vehicles and particularly such a vehicle having as a part thereof, a conditioner for the passenger compartment, whereby the latter may be cooled or otherwise treated as a result of air circulation which takes place because of the novel air conditioning apparatus which forms a part of the automotive vehicle body.

One of the important objects of this invention is to provide apparatus for conditioning air in the passenger compartment of a vehicle which may utilize a cooling medium in the summer months, whereby the temperature and humidity within the passenger compartment is controlled.

A yet further object of the instant invention is to provide unique ventilating structure for automobiles that includes a novelly disposed intake and exhaust port, with which are associated various compartments and passageways for the handling and directing of air currents to and from the passenger compartment of the vehicle in a manner which will establish the desired and contemplated result without creating in the compartment, an objectionable draft or a concentration of fresh and/or cool air at any particular point.

A further object of this invention is to provide apparatus for conditioning air in the passenger compartment of a vehicle which includes a chamber for certain parts of a refrigerating system and a room for other parts thereof, all to the end that ventilating action and necessary requirements of the refrigerating apparatus might be met as the cooling or conditioning of the air in the vehicle takes place.

A large number of minor objects of this invention will appear during the course of the following specification, referring to the accompanying drawings, wherein:

Fig. 2 is an enlarged, fragmentary, sectional view through the upper portion of the forward end of the vehicle shown in Fig. 1, and disclosing more in detail the parts of the air conditioning apparatus.

Fig. 3 is an enlarged, fragmentary, sectional view taken along line III—III of Fig. 2.

Fig. 4 is a sectional view taken along line IV—IV of Fig. 3.

Fig. 5 is an enlarged, detailed, sectional view through the intake port and directly associated parts.

Fig. 6 is a sectional view taken along line VI—VI of Fig. 5.

Fig. 7 is a sectional view taken along line VII—VII of Fig. 6, and

Fig. 8 is a diagrammatical view showing the wiring of one of the ventilating fans and control members therefor.

Figure 1:
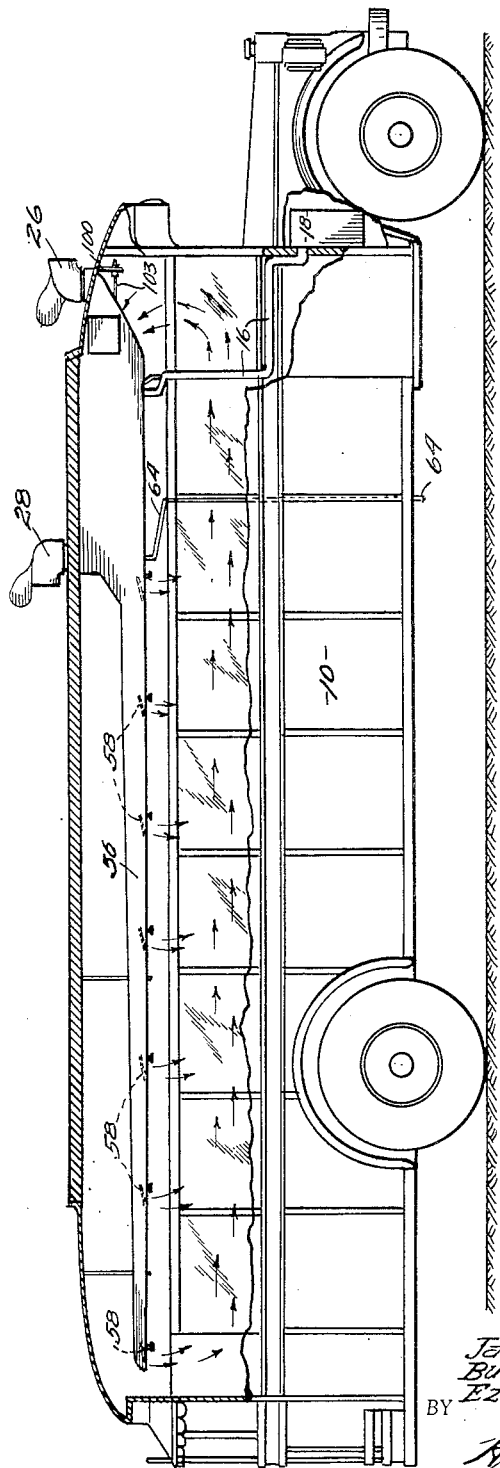
Figure 1 is a side elevation of a passenger vehicle in the form of a bus, having as a part thereof, an air conditioner constructed in accordance with this invention.

While the air conditioner contemplated by this invention might be built into passenger vehicles of various types, the same is particularly adaptable for use in combination with the well known passenger bus 10, having the ordinary passenger compartment therein and equipped with refrigerating apparatus of the well known compressor or absorption type that must, of necessity, have a set of condenser coils 12 and evaporator coils 14. These two sets of coils 12 and 14 are specially located in the apparatus forming this invention and may be joined to other parts of the refrigerator unit through a conduit 16, wherein may be housed the necessary connections to the other parts of the refrigerating apparatus diagrammatically illustrated herein and designated by the numeral 18.

The roof or top of the bus 20 has formed therein an intake port 22 and an exhaust port 24, through which may pass the currents of air in a manner hereinafter described. A revolving cowl 26 is provided above intake port 22 and a similar cowl 28 is associated with exhaust port 24. These cowls are supported by vertical shafts 30 that permit free rotation on behalf of the respective cowl members as the fins 32 and 34 formed on cowls 26 and 28 respectively are struck by the air currents and caused to be positioned in the well known manner.

A wall 36 is built into the passenger compartment of bus 10 to form a chamber which has a partition 38 dividing the same into a cooling room 40 and a housing 42. This partition 38 has an aperture 44 formed therethrough which is forwardly of exhaust port 24 and adjacent intake port 22. Aperture 44 may be opened and closed by a valve 46 and a baffle plate 48 underlies aperture 44 in spaced relation thereto so as to provide proper positioning of fan 50 which draws air from passenger compartment of bus 10 through inlet 52 and also from intake port 22 through aperture 44 when valve 46 is opened. This fan 50 directs the air so drawn across evaporator coils 14 and against a filter block or similar member 54 that may be employed to retard the flow of air so that the same may be freed of an excess amount of moisture prior to its introduction into the passenger compartment of the bus through duct 56 which extends rearwardly along the top of the bus from cooling room 40.

This duct 56 is provided with a number of outlet openings 58 and each is controlled by a door or similar member 60 so that if desired, the passenger can determine the amount of air passing from any one outlet opening that might be near him.

An auxiliary fan 62 is contemplated and may be positioned as shown in Fig. 2 and serve to assist drawing air across coils 14 through member 54 and into duct 56. Any cooling medium may be positioned in cooling room 40, but it has been found advisable to use the aforementioned coils because a continuous cooling action may take place and undesirable handling of ice or the like is avoided. When moisture is removed from the air in cooling room 40, the same will condense and drain out through pipe 64 which leads to a point exterior of the passengter compartment of bus 10. The cross sectional area of cooling room 40 is much greater than that of duct 56 and for that reason the air passing across coils 14 is further retarded for the purpose of controlling the humidity.

Condensing coils 12 are positioned in housing 42 above partition 38 and air passing through intake 22 will move across these coils 12 and thence out through exhaust port 24. Since these coils must be provided with the necessary amount of air, we have provided a fan 66 located between coils 12 and intake port 22, which will supplement the normal air currents passing into intake port 22 and insure the desired amount of air required to serve the condensing coils 12. This fan has associated therewith, electrical means whereby its speed may be increased or decreased as the amount of air passing in through intake port 22 is decreased or increased respectively.

To accomplish this end, a pivotally mounted pressure plate 68 is positioned in housing 42 forwardly of fan 66 so that air passing into intake port 22 will move against the face thereof. As air pressure on plate 68 is increased, the speed of fan 66 will be decreased because of the amount of resistance that is introduced into the circuit of this fan. The means for accomplishing this action is clearly illustrated in Figs. 3 and 4. Plate 68 is mounted upon shaft 70 and lever 72 is also carried by shaft 70. One arm of lever 72 travels in a path to engage a series of contact points 74 so that the resistances 76 might be introduced or removed from the circuit of fan 66.

A spring 78 maintains lever 72 against an adjustable stop 80 so that one arm of lever 72 will always be on one of the contact points 74, as shown in Fig. 8. As pressure plate 68 is tipped rearwardly by the increased wind pressure, the contact arm of lever 72 is moved downwardly along the series of contact points 74 so that the resistances 76 that are introduced into the fan circuit might serve to decrease the speed of fan 66. When the air pressure on plate 68 is again decreased, spring 78 will return lever 72 to the point of beginning against stop 80 and fan 66 will operate at its maximum speed. Reference to Fig. 8 will readily indicate that a main switch 82 might be employed to cut off entirely, fan 66, and when this switch is closed, the circuit will be from line 84 through wire 86, a portion of lever 72, to any one of the contact points 74, thence through the resistances 76 that might be between the certain contact points 74 and fan 66, through wire 88 to fan 66. From fan 66 the circuit is completed through wire 90, closed switch 82 and back to the other side 92 of the supply line.

Means is provided for allowing the direct escape of air from the passenger compartment to the exhaust port 24 by way of housing 42. This means is in the form of an air inlet 94 which is formed in the wall of housing 42 and in communication with the passenger compartment of the vehicle through the medium of a duct 96. A damper 98 is provided to open and close this inlet 94 and this damper is actuated simultaneously with valve 46 by a thermostat 100, which is joined to both of the aforesaid members 98 and 46 by connecting rods 102 and 103 respectively. This thermostat 100 is of the bi-metallic type and is here mentioned as exemplifying any suitable means for automatically or manually controlling the position of damper 98 and valve 46. Thermostat 100 opens damper 98 and valve 46 as the temperature in the bus increases. These two members 98 and 46 are mounted upon the same shaft 104 and when links 106 and 107, mounted upon shaft 104, are moved by connecting rods 102 and 103, both valve 46 and damper 98 are moved together; however, as valve 46 is opened to let fresh outside air into cooling room 40 and thence the passengter compartment by way of duct 56, so also will damper 98 be opened to allow the escape of warm, undesirable air directly from the passenger compartment to the exhaust port 24 by way of housing 42 and duct 96.

The relative positions of valve 46 and damper 98 to suit conditions might be altered. Rod 102 is joined to thermostat 100 by adjusting nuts 101 and rod 103 is joined to thermostat 100 by nuts 105. Adjustment of these nuts 101 and 105 will effect the aforementioned desired relative positioning of members 46 and 98.

As the outside air passes into cooling room 40 it may be filtered by filter block 108 that is positioned between partition 38 and baffle plate 48 and between fan 50 and aperture 44.

It is obvious that cowls 26 and 28 will have their openings disposed in the proper direction, while the vehicle is traveling, irrespective of the velocity of the wind. If the wind velocity is greater than the speed of bus 10, cowls 26 and 28 will properly adjust themselves so as to admit and exhaust air to and from, respectively, the passenger compartment of the vehicle 10. Using a thermostat 100 to control damper 98 and valve 46 will properly regulate the introduction of fresh air into and the removal of stale air from the passenger compartment and the employment of fans 50, 62 and 66 will insure proper circulation of air when the bus is standing. Manifestly, a duct similar to 56 may be disposed on each side of the passenger compartment and any further handling of the conditioned air may be done through branches from these main ducts.

The operation of the various parts of the air conditioning apparatus and their relation to each other has been made clear during the course of the foregoing specification which described but one form of the invention, and while said one form is particularly set down and illustrated, it is desired to be limited only by the scope of the appended claims.

Having thus described the invention, what is claimed as new and desired to be secured by Letters Patent is:

1. Apparatus for circulating air in the passenger compartment of a vehicle comprising an intake and an exhaust port formed through the top of the vehicle; a chamber formed in the compartment in communication with both of said ports; an outlet opening formed through the wall of said chamber; a second chamber having openings formed through the wall thereof interconnecting the said outlet opening with the said passenger compartment; and means for selectively causing air entering the intake port to enter the passenger compartment by way of the second chamber and said outlet openings or pass from the first mentioned chamber through the exhaust port.

2. Apparatus for conditioning air in the passenger compartment of a vehicle comprising an intake and exhaust port formed through the top of the vehicle; a chamber having an apertured partition dividing the chamber into a first compartment in communication with both of said ports, and a second compartment; a cooling medium in the second compartment; a fan in the second compartment to direct air across the said cooling medium; outlet openings forming connection between the second compartment and said passenger compartment; a valve to open and close the aperture in said partition to regulate the amount of air entering the second compartment from the said intake port; and means for operating the said valve.

3. Apparatus for conditioning air in the passenger compartment of a vehicle comprising an intake and exhaust port formed through the top of the vehicle; a chamber having an apertured partition therein dividing the chamber into a first compartment in communication with both of said ports, and a second compartment; a cooling medium in the second compartment; a fan in the second compartment to direct air across the said cooling medium; outlet openings forming connection between the second compartment and said passenger compartment; a valve to open and close the aperture in said partition to regulate the amount of air entering the second compartment from the said intake port; an air inlet formed in the wall of said first compartment to exhaust air from the passenger compartment into said first compartment; a damper in said air inlet to control the passage of air from said compartment to the said first compartment; and means for simultaneously operating the said valve and said damper.

4. Apparatus for conditioning air in the passenger compartment of a vehicle comprising an intake and exhaust port formed through the top of the vehicle; a chamber having an apertured partition therein dividing the chamber into a first compartment in communication with both of said ports, and a second compartment; a cooling medium in the second compartment; a fan in the second compartment to direct air across the said cooling medium; outlet openings forming connection between the second compartment and said passenger compartment; a valve to open and close the aperture in said partition to regulate the amount of air entering the second compartment from the said intake port; an air inlet formed in the wall of said first compartment to exhaust air from the passenger compartment into said first compartment; a damper in said air inlet to control the passage of air from said compartment to the said first compartment; and means for simultaneously operating the said valve and said damper, said operating means comprising a thermostatically actuated lever extending into the said passenger compartment.

5. Apparatus for conditioning air in the passenger compartment of a vehicle comprising an intake and an exhaust port formed through the top of the vehicle; a chamber having an apertured partition therein dividing the chamber into a first compartment in communication with both of said ports, and a second compartment; a cooling medium in the second compartment; outlet and inlet ports establishing connection between second compartment and passenger compartment; a valve to regulate the size of the aperture in said partition; means to open and close the valve; an inlet formed in the second compartment wall establishing connection between said second compartment and the passenger compartment; and a fan in the second compartment to selectively draw air into the same and force air across the cooling medium from either the passenger compartment or the intake port by way of the first compartment.

6. Apparatus for conditioning air in the passenger compartment of a vehicle having a cooling medium with evaporator coils and condenser coils, comprising an air intake port and an air exhaust port formed in the vehicle; a chamber having an apertured partition therein dividing the chamber into a first compartment and a second compartment; means for selectively directing the desired amount of air from the intake port into either the said first compartment or second compartment; air outlet and inlet openings formed in the wall of the second compartment to direct air into and receive air from the passenger compartment respectively; a fan in the first compartment; a plate adjacent the intake port adapted to be moved by varying wind pressures thereagainst; and means interconnecting said plate and fan whereby to vary the speed of the fan as the wind pressure against the said plate is varied, said evaporator coils being in the said second compartment and condenser coils being in said first compartment to receive forced draft from both the fan and intake port, said exhaust port being in connection with the said first compartment.

7. Apparatus for conditioning air in the passenger compartment of a vehicle having a cooling medium with evaporator coils and condenser coils, comprising in combination an air intake and an air exhaust port formed in the top of the vehicle; a chamber having an apertured partition therein to divide the same into a first compartment and a second compartment; a valve to open and close the aperture in the partition to regulate the flow of air from said intake port to either the said first compartment or second compartment; a duct extending from one end of the second compartment having outlet openings formed therein; an inlet opening in the other end of said second compartment to permit passage of air from the passenger compartment to the said second compartment; fans in the first compartment and second compartment respectively; and an inlet port having a damper therein interconnecting said passenger compartment and the said first compartment, said valve and said damper being simultaneously operable by common means, said condenser coils being in the said first compartment and the exhaust port being in communication with the said first compartment, said evaporator coils being in the said second compartment between the said aperture in the partition and inlet opening, and the said outlet openings in the said duct.

8. Apparatus for circulating air in the passenger compartment of a vehicle comprising a chamber having a partition dividing the same into a first and a second compartment; means forming intake and exhaust ports through the top of the vehicle and connected with said first compartment; means forming a duct extending from one end of the second compartment; outlet openings formed with the duct to interconnect the same with the passenger compartment of the vehicle; an air inlet formed in the other end of said second compartment; and means for selectively causing air entering the intake port to pass through the first compartment and exhaust port or said second compartment.

9. Apparatus for conditioning air in the passenger compartment of a vehicle comprising a chamber having a partition dividing the same into a first and a second compartment; means forming intake and exhaust ports through the top of said vehicle and connected with said first compartment; means selectively connecting said first and second compartments; outlet means formed with said second compartment to interconnect the same with the passenger compartment; an air inlet formed in one end of said second compartment; and a fan to force air from second compartment through said outlet.

10. Apparatus for conditioning air in the passenger compartment of a vehicle comprising a chamber having a partition dividing the same into a first and a second compartment; means forming intake and exhaust ports through the top of said vehicle and connected with said first compartment; means selectively connecting said first and second compartments; outlet means formed with said second compartment to interconnect the same with the passenger compartment; an air cooling medium in said second compartment; an inlet means formed with said second compartment to interconnect the same with the passenger compartment; and means for selectively causing air entering the intake port to enter the said second compartment or the said first compartment in desired proportions.

11. Apparatus for conditioning air in the passenger compartment of a vehicle comprising a chamber having a partition dividing the same into a first and a second compartment; means forming intake and exhaust ports through the top of said vehicle and connected with said first compartment; means selectively connecting said first and second compartments; outlet means formed with said second compartment to interconnect the same with the passenger compartment; an air cooling medium in said second compartment; an inlet means formed with said second compartment to interconnect the same with the passenger compartment; an air inlet means formed to interconnect the first compartment and said passenger compartment; and means for opening and closing said air inlet to the first compartment.

12. Apparatus for conditioning air in the passenger compartment of a vehicle comprising a chamber having a partition dividing the same into a first and a second compartment; means forming intake and exhaust ports through the top of said vehicle and connected with said first compartment; means selectively connecting said first and second compartments; outlet means formed with said second compartment to interconnect the same with the passenger compartment; an air cooling medium in said second compartment; an inlet means formed with said second compartment to interconnect the same with the passenger compartment; an air inlet means formed to interconnect the first compartment and said passenger compartment; and means for opening and closing said air inlet to the first compartment, said means for opening and closing said air inlet to the first compartment from the passenger compartment serving to also open or close the aforesaid means connecting the first and second compartments.

JAMES E. HAMMERS.
BURT F. HAMMERS.
EZRA C. BUEHLER.